United States Patent [19]
Seto

[11] Patent Number: 4,868,779
[45] Date of Patent: Sep. 19, 1989

[54] DEVICE HAVING BOTH STANDARD AND SUPPLEMENTARY CHARACTER CORRESPONDENCE TABLES FOR GENERATING CHARACTER CODES

[75] Inventor: Tetsuo Seto, Iwatsuki, Japan

[73] Assignee: Fuji Xerox Co., Ltd., Tokyo, Japan

[21] Appl. No.: 90,060

[22] Filed: Aug. 27, 1987

[30] Foreign Application Priority Data

Sep. 1, 1986 [JP] Japan ............................. 61-203633

[51] Int. Cl.$^4$ .......................... G06F 3/14; G06F 15/38
[52] U.S. Cl. .................................. 364/900; 364/926.7; 364/928.6; 364/948.1
[58] Field of Search ... 364/200 MS File, 900 MS File

[56] References Cited

U.S. PATENT DOCUMENTS

| | | | |
|---|---|---|---|
| 3,996,584 | 12/1976 | Plager | 364/900 |
| 4,122,533 | 10/1978 | Kubinak | 364/900 |
| 4,604,712 | 8/1986 | Orrhammar | 364/900 |
| 4,670,841 | 6/1987 | Kostopoulos | 364/900 |

FOREIGN PATENT DOCUMENTS

| | | |
|---|---|---|
| 0075673 | 6/1983 | European Pat. Off. . |
| 49-131737 | 5/1974 | Japan . |
| 2072388 | 9/1981 | United Kingdom . |
| 2106677 | 4/1983 | United Kingdom . |

OTHER PUBLICATIONS

Abrahamson et al., "Automatic Mode Select on the IBM Keyboard", IBM Technical Disclosure Bulletin, vol. 26, No. 11, Apr. 1984.

Primary Examiner—Jerry Smith
Assistant Examiner—James J. Kulbaski
Attorney, Agent, or Firm—Armstrong, Nikaido, Marmelstein, Kubovcik & Murray

[57] ABSTRACT

A character code generating device includes a standard character code correspondence table for storing the character codes each corresponding to individual key-inputs from a key board, a searching device for the for said standard character code correspondence table to generate the character codes corresponding to the key-inputs, a supplementary character code correspondence table and a judging device. The supplementary character code correspondence table serves to store the character codes different from those in the standard character code correspondence table with respect to the specified key-inputs from the key board. The judging device determines whether the search of the supplementary character code correspondence table is required or not. Upon a determination relative to the search of the supplementary character code correspondence table by the judging devices, the searching devices operates to preferentially search the supplementary character code correspondence table prior to the standard character code correspondence table.

4 Claims, 9 Drawing Sheets

| KEY INDICATION | INDICATIVE MARK OF CHARACTER CODE |
|---|---|
| ， | 、 |
| ○ | ○ |
| ― | ― |
| 「 | 「 |
| 」 | 」 |
| 「 | 「 |
| 」 | 」 |
| 〔 | 〔 |
| 〕 | 〕 |
| を | を |
| ん | ん |

FIG. 2

| KEY INDICATION | INDICATIVE MARK OF CHARACTER CODE |
|---|---|
| 、 | ， |

FIG. 3

| KEY INDICATION | INDICATIVE MARK OF CHARACTER CODE |
|---|---|
| 、 | 、 |
| ○ | ○ |
| ー | 丨 |
| ┌ | ┐ |
| ┘ | └ |
| ┌ | ┐ |
| ┘ | └ |
| 〔 | ⌒ |
| 〕 | ⌣ |

FIG. 6

| KEY INDICATION | INDICATIVE MARK OF CHARACTER CODE |
|---|---|
| ˋ | ˋ |
| ˚ | • |

FIG. 8

| KEY INDICATION | INDICATIVE MARK OF CHARACTER CODE |
|---|---|
| ˋ | ˋ✖ |
| ˚ | • |

FIG. 9

DEVICE HAVING BOTH STANDARD AND SUPPLEMENTARY CHARACTER CORRESPONDENCE TABLES FOR GENERATING CHARACTER CODES

FIELD OF THE INVENTION AND RELATED ART STATEMENT

The present invention relates to a device for generating character codes which are required mainly for creating sentences. This device is incorporated in a word processor, a personal computer unit or the like. More particularly, the present invention relates to an improved character code generating device capable of satisfying a demand for modifying a part of the original character codes in accordance with the attributes of sentences or the preference of an operator.

Generally, a device for making sentences which is used in the word processor or the personal computer, as illustrated in FIG. 11, includes a key board 1, a computer unit 2 and a display unit 3. The key board 1 has a variety of keys 1a arranged therein. The computer unit 2 selects the character code corresponding to a key input from the key board 1. The display unit 3 displays the characters selected by the computer unit 2. As shown in FIG. 12, the computer unit 2 consists of a character code generating device 5 for generating the character codes corresponding to the key inputs from the key board 1 and a sentence editing device 6 for editing the generated character codes in a predetermined format.

The conventional character code generating device 5 is employed in such a sentence creating device. The character code generating device 5 includes: a standard character code correspondence table 10 in which the character codes corresponding to the individual key-inputs from the key board 1 are stored; and a searching device 11 associated with the standard character code correspondence table 10. In this configuration, The corresponding character codes are searched from the standard character code correspondence table 10 on the basis of the key-inputs produced by pressing the keys of the key board 1.

In some cases, a part of the character codes stored in the standard character code correspondence table 10 are likely to be modified, depending upon the preference of the operator or upon the attributes of sentences to be created, i.e., the directions (writings in lateral and longitudinal lines) in which the characters are arrayed.

More specifically, if the standard character code correspondence table 10 is based on the Japanese cursive syllabary in conformity with the Japanese Industrial Standard where the standard format involves writing in a lateral line, "A Standard for Expressing the Official Writings" (hereinafter referred to as the Standard for the Agency for Cultural Affairs) published by the Japanese Language Division of the Cultural Department in the Agency of Cultural Affairs states that "．""，" are used as punctuation marks for longitudinal writing, however the preferable usage of punctuation marks is "．""，" (comma) in lateral writing. When editing the sentences in the lateral direction in accordance with the "Standard of the Agency for Cultural Affairs", a request for changing the ordinary punctuation mark "，" into the above described mark "，" may probably arise. The indicative marks of the characters differ according to lateral writing or longitudinal writing when employing parentheses for sectioning particular sentences. As a result, it may be requested that a part of the character codes, stored in the standard character code correspondence table 10 in which the standard format is lateral writing, be changed into the format of longitudinal writing. Even when using a varied pattern of indicative marks of the character codes in accordance with the preference of the operator, a probable demand is the partial modification of the character codes in the standard character code correspondence table 10.

In the prior art, the following measures were taken to meet the above-described demands. As the standard character code correspondence table 10, whose standard format is lateral writing, an ordinary table and another table based on the Standard of the Agency for Cultural Affairs are separately prepared. Alternatively, the standard character code correspondence table 10 for longitudinal writing and another one for lateral writing are respectively provided for accomodating the directions in which the sentences are arranged. The selection of the standard character code correspondence tables 10 is adequately, it can be considered, made in accordance with the preference of the operator or the attributes of the sentences. If the varied pattern of indicative marks of the character codes is employed depending upon the preference of the operator, the standard character code correspondence table 10 in which the replacement into the character codes of the varied pattern has already been made is to be prepared, and the standard character code correspondence tables are properly selected.

In this mode, however, on the occasion of provision of the standard character code correspondence tables adapted to the practical purpose, the number of such tables increases undesirably as the practical purpose is diversified. This leads to a rise in cost of the system which is proportional to the increase in number of the tables. In addition, since a large proportion of the character codes stored in the respective standard character code correspondence tables 10 are common except for a small number of the character codes, if particular tables among a plurality of the standard character code correspondence tables 10 are extremely frequently used, a problem arises. That is, the using-efficiency of the standard character code correspondence tables 10 having less frequency of being employed is extremely lowered.

OBJECT AND SUMMARY OF THE INVENTION

Accordingly, it is a primary object of the present invention which is made to obviate the above-described problems to provide a character code generating device capable of generating the character codes with a high efficiency in accordance with the preference of the operator and the attributes of sentences, this device being simply constructed with no futility.

The character code generating device according to the present invention comprises: a standard character code correspondence table in which the character codes each corresponding to each key-input from the key board are stored. A searching device searches the standard character code correspondence table to generate the character codes corresponding to the key-inputs. A supplementary character code correspondence table stores the character codes different from those within the foregoing standard character code correspondence table with respect to the specified key-inputs from the key board. A judging device determines whether the search of the supplementary character code correspondence table is needed or not. Where the judging device determines that the supplementary character code correspondence table should be searched, the searching device operates to preferentially search the supplementary character code correspondence table prior to the standard character code correspondence table.

In a device of the present invention, the number of the standard character code correspondence tables is not confined to one but may be plural. In a mode in which a plurality of the standard character code correspondence tables are used, the individual tables may be arranged to store such different character codes as the Japanese cursive syllabary, English characters, Arabian characters, Russian characters and so on which correspond to the proper key-inputs. In a mode where a number of the standard character code correspondence tables are used, the character code generating device, which is previously equipped with a plurality of the standard character code correspondence tables, may be constructed to make an adequate selection by a change-over device, or else such a character code generating device may selectively be provided with the desired standard character code correspondence tables.

The number of supplementary character code correspondence tables is not limited to one but may be plural. In this case, the contents of the supplementary character code correspondence tables may fixedly or rewritably be set. In a mode wherein many supplementary character code correspondence tables are employed, the character code generating device which previously incorporates a plurality of the supplementary character code correspondence tables may be constructed to make an adequate selection by the change-over device, or else the same device may selectively be provided with the desired supplementary character code correspondence tables.

In connection with the judging device for determining whether the supplementary character code correspondence tables should be searched or not, a human determination may be made on the basis of the desire of the operator. Similar to a sentence editing device, the judging device may be constructed to automatically make a determination in response to an information signal representative of an editing format of the sentences to be created.

It is fundamentally required that the searching device serves to search the standard character code correspondence tables. The searching device searches the supplementary character code correspondence table prior to the standard table only when the search of this table is determined by the judging device. The tangible construction of this means is not particularly confined.

According to the above-described description, if the judging device determines that no search of the supplementary character code correspondence table is required, the searching device only searches the previously standardized character code correspondence table, thereby generating the character codes corresponding to the key-inputs. In contrast with this, if the judging device determines that the search of the supplementary standard character code correspondence tables is needed, the searching device first searches the supplementary character code correspondence tables prior to the standard character code correspondence tables. If the relevant character codes exist in the supplementary character code correspondence tables, these character codes are generated. If the relevant character codes are not in the supplementary character code correspondence tables, the pertinent character codes are generated from the standard character code correspondence tables.

As explained above, the character code generating device according to the present invention includes the supplementary character code correspondence tables for storing only the character codes that are to be modified as well as the existing standard character code correspondence tables, which ensures that the character codes based on the attributes of sentences and the preference of the operator can exactly be generated with a simple construction having no futility. This construction does not bring about an unnecessary increment in number of the standard character code correspondence tables.

BRIEF DESCRIPTION OF THE DRAWINGS

FIG. 2 is an explanatory illustration showing a tangible example of the standard character code correspondence table used in the first embodiment;

FIG. 3 is an explanatory illustration showing a tangible example of the supplementary character code correspondence table used in the first embodiment;

FIG. 6 is an explanatory illustration showing a tangible example of the supplementary character code correspondence table in the second embodiment;

FIGS. 8 and 9 are explanatory illustrations showing tangible examples of the supplementary character code correspondence table in the third embodiment;

DETAILED DESCRIPTION OF THE PREFERRED EMBODIMENTS

Embodiments of the present invention will hereinafter be described in detail with reference to the accompanying drawings.

EMBODIMENT 1

Figure 1:
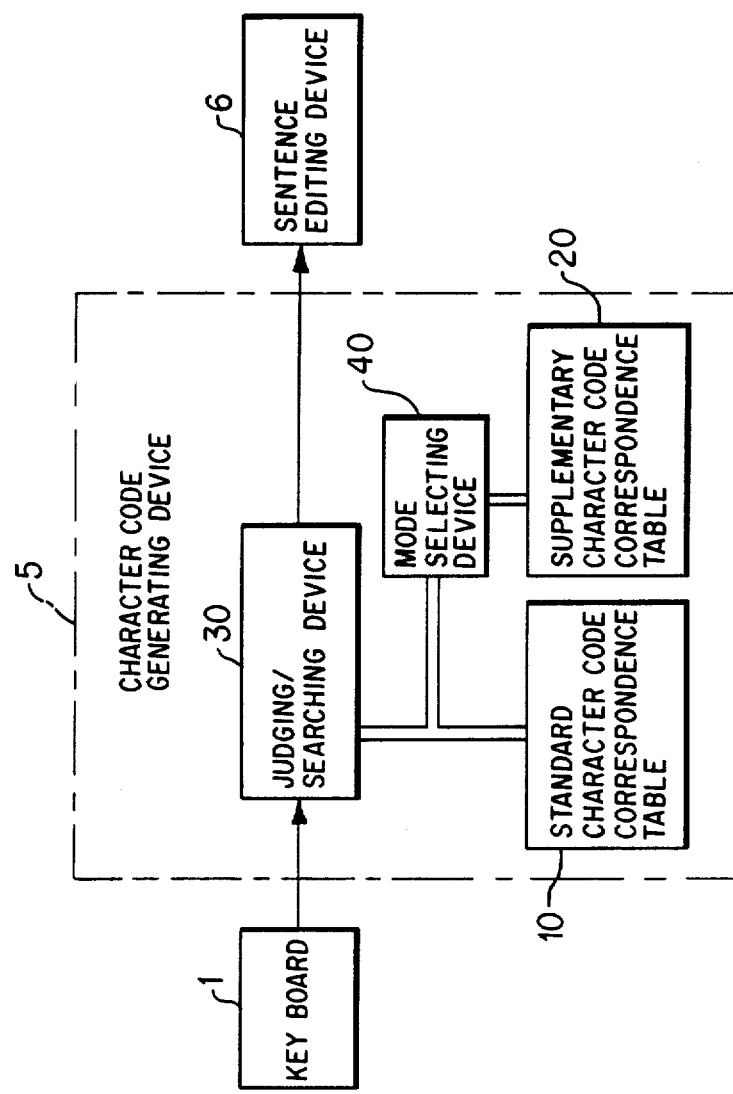
FIG. 1 is a block diagram showing a first embodiment of the character code generating device according to the present invention.

As illustrated in FIG. 1, a character code generating device 5 is composed of a standard character code correspondence table 10, a supplementary character code correspondence table 20 and a judging/searching device 30. The standard character code correspondence table 10 serves to store the character codes corresponding to respective key-inputs from a key board 1. The supplementary character code correspondence table 20 serves to store different character codes from those in the standard character code correspondence table 10 with respect to the specified key-inputs. The judging/searching device 30 determines whether the supplementary character code correspondence table 20 should be retrieved or not. If so, the device 30 searches the standard character code correspondence table 10 or the supplementary character code correspondence table 20 in a specified manner based on the thus determined condition. The supplementary character code correspondence table 20 is manually connected via a disconnectable mode selecting device to the judging/searching device 30. The character codes output from the judging/searching device are transmitted to a sentence editing device 6.

In this embodiment, the standard character code correspondence table 10 is of a type having a standard format for lateral writing and is based on the Japanese cursive syllabary (including punctuation marks and parentheses). As depicted in FIG. 2, the character codes exhibit indicative marks in the right column which correspond to key indications shown in the left column. Such character codes are stored in a searchable manner. The supplementary character code correspondence table 20 is set in conformity with the above-mentioned Standard of the Agency for Cultural Affairs. As shown in FIG. 3, the character code exhibit the indicative mark "," in the right column which corresponds to the specified key indication "," in the left column. The character code is searchably stored. In this embodiment, the judging/searching device 30 operates in accordance with the procedures shown in the flow chart of FIG. 4.

Figure 4:
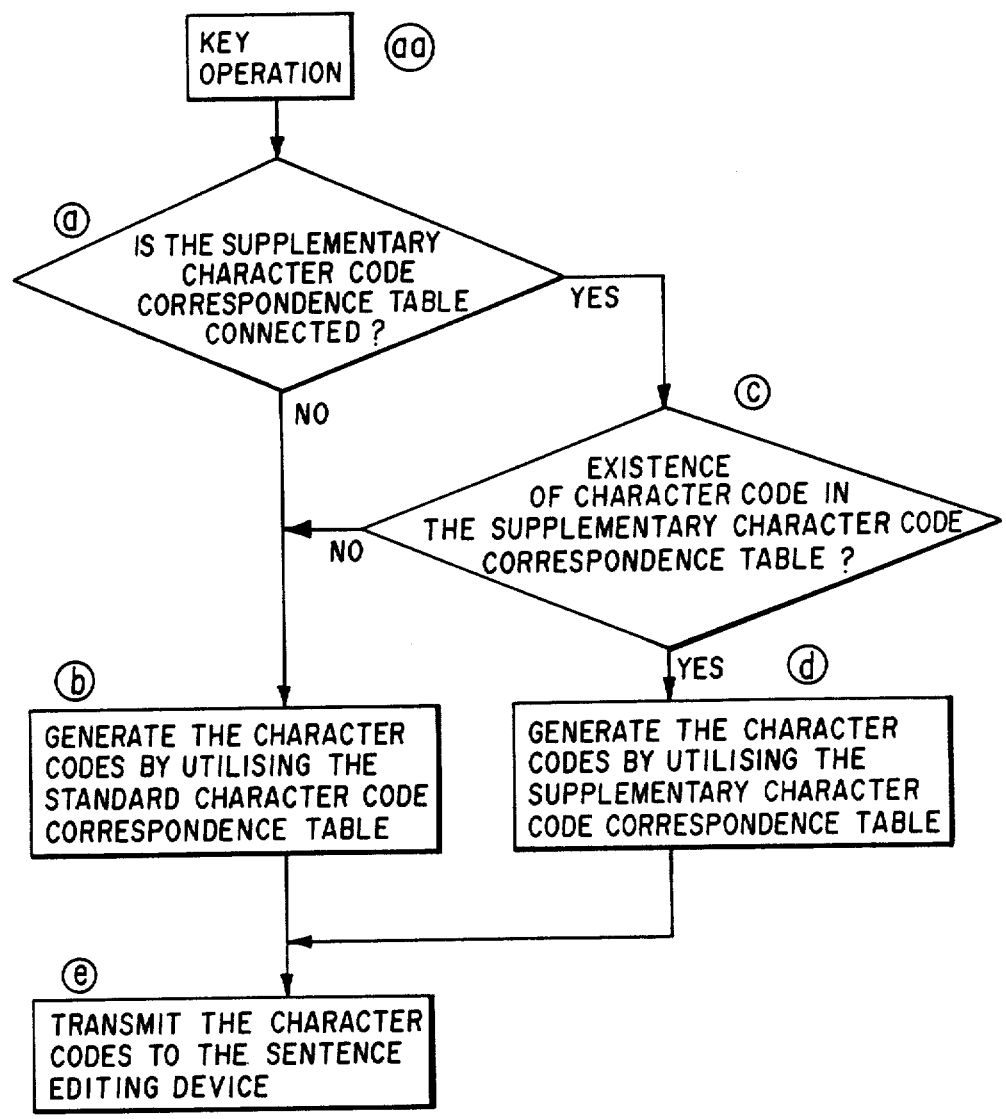
FIG. 4 is a flow chart showing operative procedures of the judging/searching device in the first embodiment.

When a shut-off mode is selected by the mode selecting device 40 in the character code generating device of the present invention, upon an operation of a key in step 1, the judging/searching device 30, as shown in step a of FIG. 4, makes a determination as to whether the supplementary character code correspondence table 20 is connected or not. At this time, since the supplementary character code correspondence table 20 is not connected to the judging/searching device 30, the judging/searching device 30, as shown in step b of FIG. 4, generates the character code corresponding to the key-input by only searching the standard character code correspondence table 10. Subsequent to this step, as shown in step e of FIG. 4, the judging/searching device 30 transmits the generated character code to the sentence editing device 6.

Where the writings are created in the lateral lines in conformity with "the Standard of the Agency for Cultural Affairs", a connection mode is selected by the mode selecting device 40, and thereafter a series of key operations may be performed. After the key operations have been carried out, the judging/searching device 30 recognizes that the supplementary character code correspondence table 20 is connected in accordance with step a of FIG. 4 and moves to step c. In the step c, the judging/searching device 30 first searches the character code corresponding to the key-input from the key board 1 in the supplementary character code correspondence table 20 prior to searching the standard character code correspondence table 10. When the key-input from the key board 1 is ",", the judging/searching device 30 determines that the character code corresponding to the key-input exists in the supplementary character code correspondence table 20. As shown in step d, the judging/searching device 30 generates the character code (indicative mark ",") which corresponds to the key-input from the supplementary character code correspondence table 20. If the key-input from the key board 1 indicates the one except ",", the judging/searching device 30 determines that no character code corresponding to the key-input is present in the supplementary character code correspondence table 20. In consequence, the judging/searching device 30, as shown in the step b, searches the standard character code correspondence table 10, thereby generating the character code corresponding to the key-input. Subsequently, the device 30, as shown in step e, transmits the thus generated character code to the sentence editing device.

EMBODIMENT 2

Figure 5:
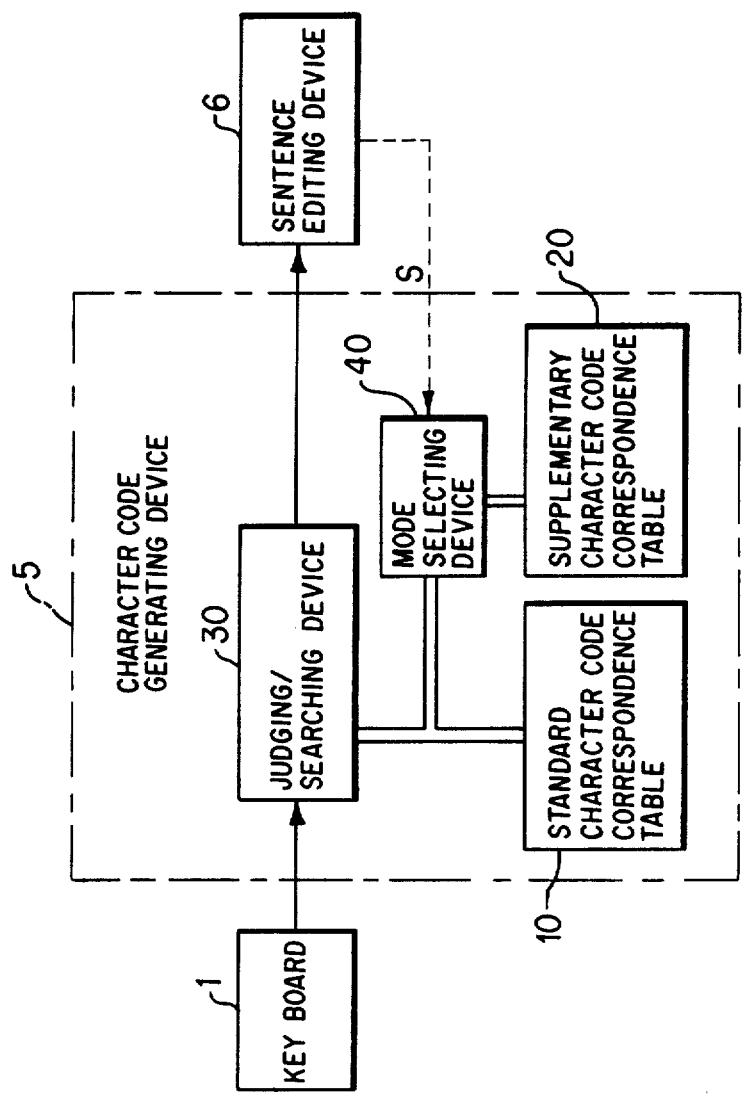
FIG. 5 is a block diagram showing a second embodiment of the character code generating device according to the present invention.

Referring to FIG. 5, there is shown the character code generating device 5 whose fundamental construction is almost the same as that of the first embodiment. Unlike the first embodiment, however, the supplementary character code correspondence table 20, as illustrated in FIG. 6, stores different character codes from the standard character code correspondence table 10 (lateral writing) with respect to the key indications associated with the indicative marks which differ from those in lateral writing at the time of making longitudinal writings. The mode selecting device 40 serves to disconnectably connect the supplementary character code correspondence table 20 to the judging/searching device 30. This mode selecting device 40 is arranged to automatically select a connection mode from the shut-off mode, synchronizing with a signals s which indicates longitudinal writing in the sentence editing formats (lateral writing/longitudinal writing) that the sentence editing device recognizes.

Where the writings are created in lateral lines in the character code generating device according to the present invention, the sentence editing device 6 is previously made to recognize that the format for editing the sentences is lateral writing. As a result, the mode selecting device 40 remains in the shut-off mode. When operating the key in this state, the judging/searching device 30 retrieves only the standard character code correspondence table 10 using the same procedures as those of the first embodiment, thereby generating the character codes corresponding to the key-inputs.

Where the writings are created in longitudinal lines, the sentence editing device 6 recognizes that the format for editing the sentences is longitudinal writing, the mode selecting device 40 automatically selects the connection mode, synchronizing with the signal s transmitted from the sentence editing device 6. When operating the key in this state, the judging/searching device 30 first searches the supplementary character code correspondence table 20 prior to the standard character code correspondence table 10 using the same procedures as those of the first embodiment, thereby generating the character code corresponding to the key-input.

In this embodiment, the supplementary character code correspondence table 20 is automatically disconnected from the judging/searching device 30 depending upon the format for editing the sentences, and hence the manual selecting operation is not required. For this reason, it is possible to concentrate on the key operation as compared with the first embodiment. Even if the longitudinal writings and the lateral writings are combined to form a composition on the same page, there is absolutely no anxiety for mistakenly selecting the character codes for display because of a mistake in the selecting operation of the mode selecting device 40.

EMBODIMENT 3

Figure 7:
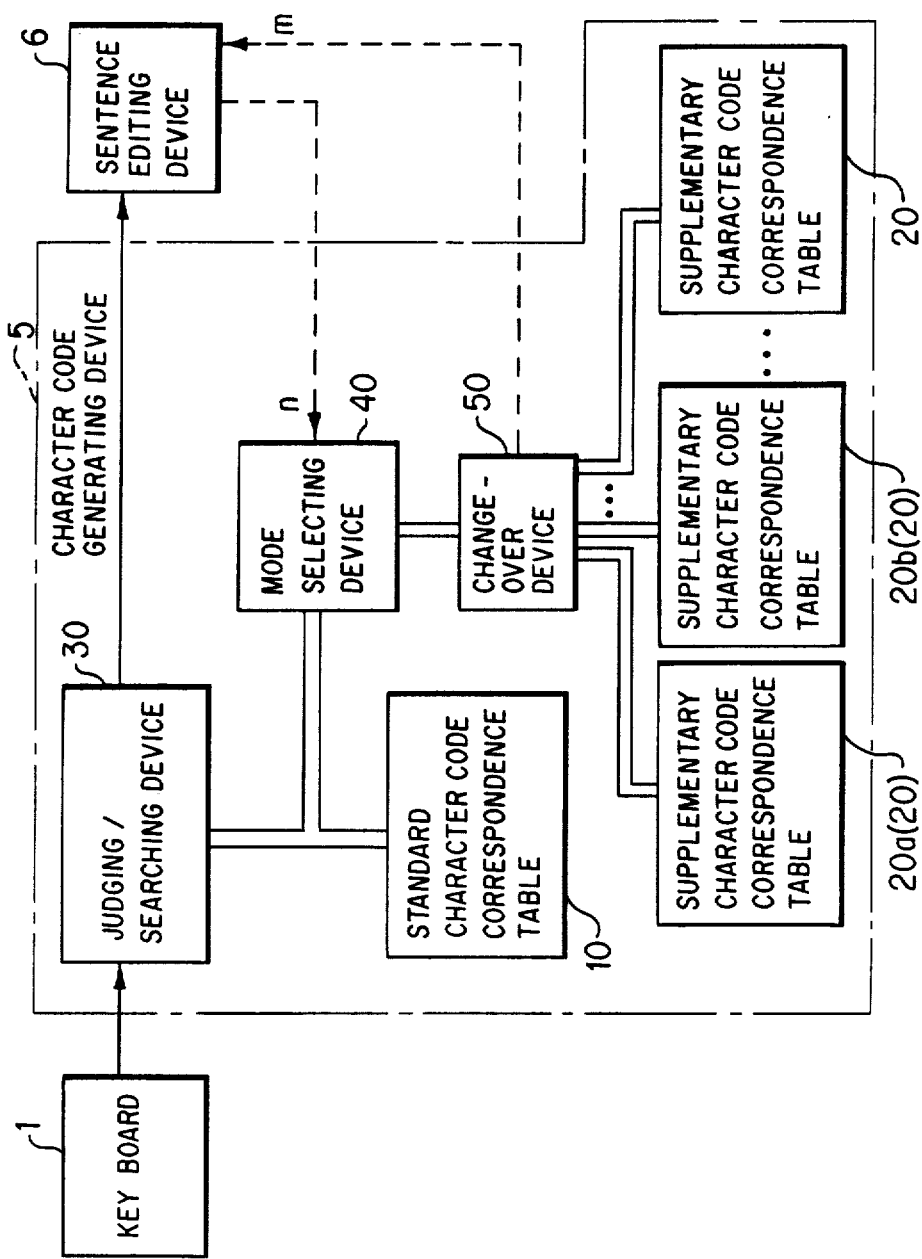
FIG. 7 is a block diagram showing a third embodiment of the character code generating device according to the present invention.

In FIG. 7, the character code generating device has its fundamental construction which is substantially the same as that in the second embodiment. A different point from the second embodiment is that a plurality of the supplementary character code correspondence tables 20 are disposed in the character code generating device 5; and the individual tables 20 are properly selected and changed over by a change-over device 50.

In the third embodiment, the character codes which differ according to practical purpose or a plurality of the character codes are stored in the individual character code correspondence tables 20. To be specific, character codes such as illustrated in FIG. 6 are stored in the supplementary character code correspondence table 20a, and the character codes shown in FIG. 3 are stored in the supplementary character code correspondence table 20b. The change-over device 50 transmits a signal m indicating the supplementary character code correspondence table 20 which is to be selected, and this signal m is sent to the sentence editing device 6. The sentence editing device 6 recognizes the specific supplementary character code correspondence table 20 which is to be selected for the change-over in response to the signal m and at the same time recognizes the format for editing the sentences. On the basis of this recognition, the sentence editing device 6 transmits a selection signal n to the mode selecting means 40, and the shut-off mode or the connection mode is selected by the mode selecting means 40.

In the character code generating device relative to the third embodiment, supposing that the specified supplementary character code correspondence table 20a is selected for the change-over, the sentences are created in lateral lines. In this case, the mode selecting device 40 automatically selects the shut-off mode, while the judging/searching device only searches the standard character code correspondence table 10. Where the sentences are made in longitudinal lines, the mode selecting means 40 automatically selects the connection mode, while the judging/searching device 30 first searches the supplementary character code correspondence table 20a prior to the standard character code correspondence table 10.

Assuming that another supplementary character code correspondence table 20b is selected for the change-over, the sentences are created in the ordinary lateral lines. In this case, the mode selecting device 40 automatically selects the shut-off mode, and the judging/searching device 30 only searches the standard character code correspondence table 10. In the case of making the sentences in lateral lines based upon the standard of the Agency for Cultural Affairs, the mode selecting device 40 automatically selects the selection mode, and the judging/searching device 30 first searches the supplementary character code correspondence table 20b.

In this way, it is feasible to generate the character codes adapted to a wide range of practical purposes. This facilitate the creation of the best sentences.

In the third embodiment, when the indicative mark "." of punctuation is employed instead of "·", the character code of the indicative mark ". " with respect to the key indication "·" may additionally, as illustrated in FIG. 8, be stored in the supplementary character code correspondence table 20b. Where the indicative mark "," of punctuation is modified into ",**" (* denotes a space for English and numerals) according to the preference of the operator, for instance, as illustrated in FIG. 9, the character code of the indicative mark ",**" with respect to the key indication "," exhibiting the punctuation may be rewritten and stored.

EMBODIMENT 4

Figure 10:
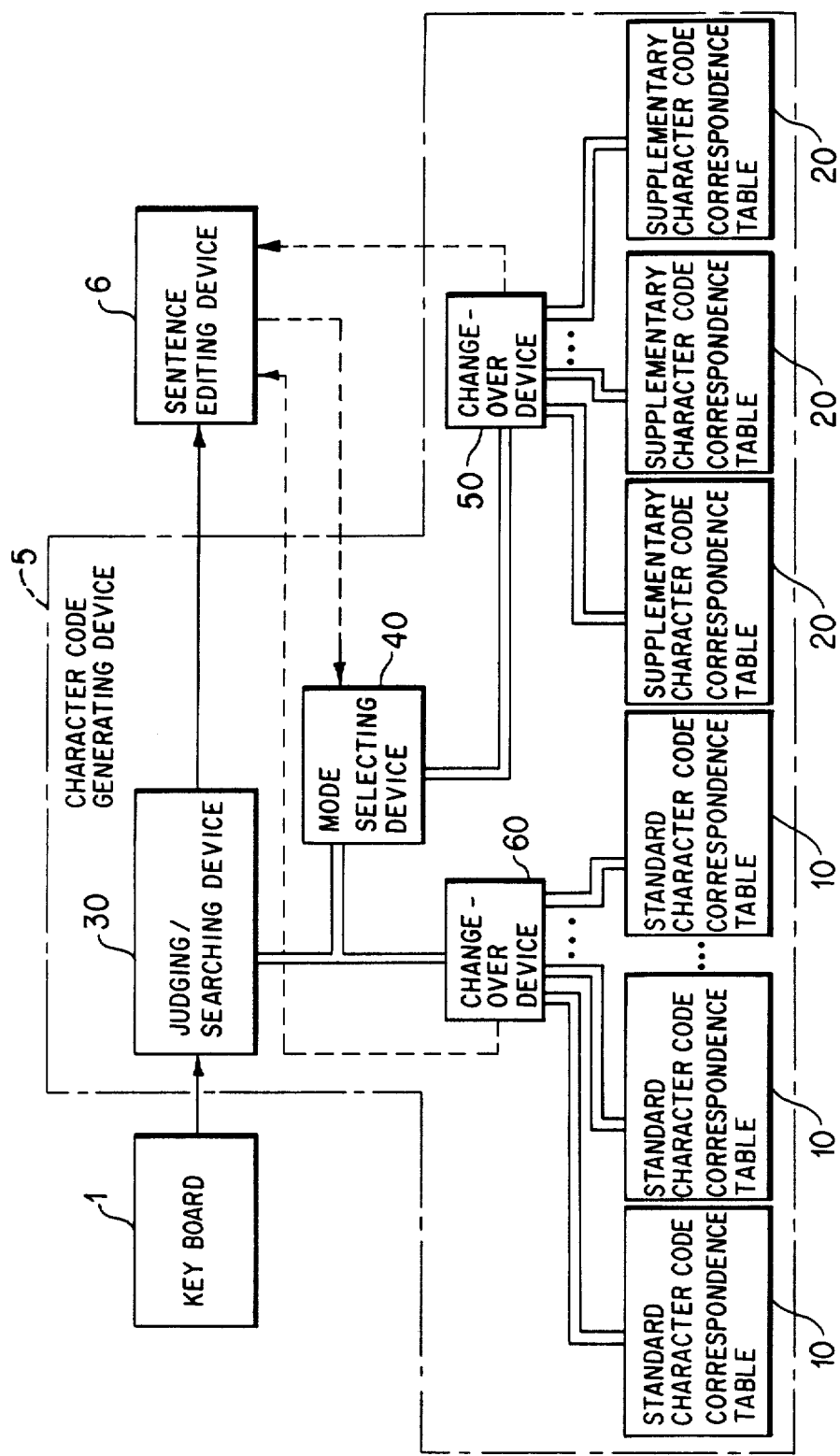
FIG. 10 is a block diagram showing a fourth embodiment of the character code generating device according to the present invention.
Figure 11:
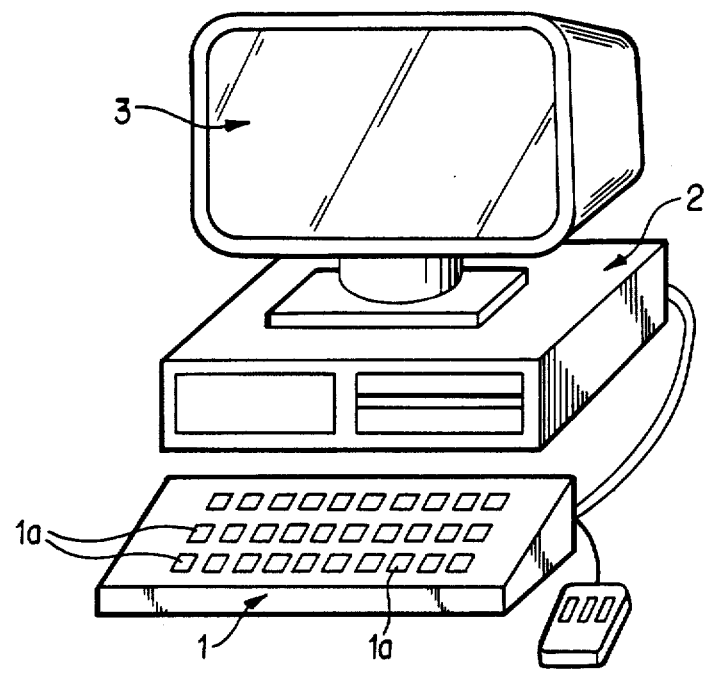
FIG. 11 is an explanatory view showing an apparatus which utilises the character code generating device.
Figure 12:
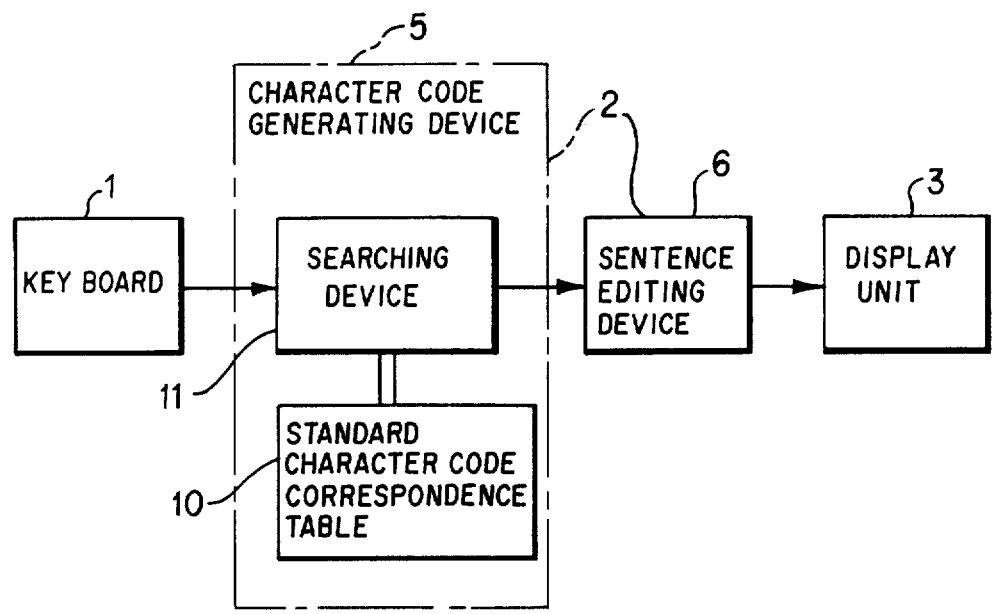
FIG. 12 is a block diagram showing one example of a conventional character code generating device.

The character code generating device depicted in FIG. 10 includes a plurality of the standard character code correspondence table 10 in addition to the fundamental construction shown in the third embodiment. The respective standard character code correspondence tables 10 are properly selected for the change-over by the change-over device 60. In this embodiment, a plurality of the standard character code correspondence table 10 involves a wide variety of types such as symbolic characters, English characters, Russian characters and the Japanese cursive syllabary for lateral writing as well. The supplementary character code correspondence tables 20 are properly selected on the basis of the preference of the operator and the attributes of the sentences with respect to the individual standard character code correspondence tables 10.

In the fourth embodiment, the sentence editing device 6 recognizes the specific standard character code correspondence table 10 which is to be selected for the change-over by the change-over device 60. The selective operation of the mode selecting device 40 is performed, taking this information into consideration.

In the character code generating device relative to the fourth embodiment, the proper standard character code correspondence table 10 is selected for the change-over, and it is possible to employ the proper supplementary character code correspondence table 20 in an additional manner with respect to the selected standard character code correspondence table 10. Hence, the character code adapted to a wider range of practical purposes than those of the third embodiment can be generated.

What is claimed is:

1. A character code generating device comprising:
   a standard character code correspondence table for storing character codes each corresponding to each key-input from a key board;
   searching means, connected to said standard character code correspondence table and said key board, for searching said standard character code correspondence table for generating said character codes each corresponding to said key-input;
   a supplementary character code correspondence table for storing character codes which are different from said character codes in said standard character code correspondence table with respect to said specified key-input from said key board;
   a mode selecting means, connected to said searching means and said supplementary character code correspondence table, for automatically indicating whether or not said standard supplementary character code correspondence table is to be selected based upon an input editing format signal; and
   judging means, connected to said mode selecting means and searching means, for determining whether a search of said supplementary character code correspondence table is needed or not based upon an indication from said mode selecting means, said searching means first searching said supplementary character code correspondence table prior to searching said standard character code correspondence table when said judging means determines that said supplementary character code correspondence table is to be searched.

2. A character code generating device as set forth in claim 1, wherein a plurality of said standard character code correspondence tables are provided and one of said tables is selected by a change-over means.

3. A character code generating device as set forth in claim 1, wherein a plurality of said supplementary character code correspondence tables are provided to be independently selectable by said judging means for use with said one standard character code correspondence table.

4. A character code generating device according to claim 1, wherein said mode selecting means has a manually selected mode for manually selecting said supplementary character code correspondence table.

* * * * *